(12) United States Patent
Shimizu et al.

(10) Patent No.: US 8,061,038 B2
(45) Date of Patent: Nov. 22, 2011

(54) METHOD AND APPARATUS FOR ASSEMBLING ROLLING BEARING

(75) Inventors: Shigenori Shimizu, Kashihara (JP); Yoshiaki Nagashio, Kashiwara (JP)

(73) Assignee: JTEKT Corporation, Osaka-Shi, Osaka (JP)

( * ) Notice: Subject to any disclaimer, the term of this patent is extended or adjusted under 35 U.S.C. 154(b) by 922 days.

(21) Appl. No.: 12/076,211

(22) Filed: Mar. 14, 2008

(65) Prior Publication Data

US 2008/0222893 A1 Sep. 18, 2008

(30) Foreign Application Priority Data

Mar. 15, 2007 (JP) .................. 2007-066530

(51) Int. Cl.
*B23P 17/00* (2006.01)
(52) U.S. Cl. .................. 29/898.09; 29/898; 29/898.061; 29/898.066; 29/898.07; 29/700; 384/584
(58) Field of Classification Search .............. 29/898, 29/898.061, 898.066, 898.07, 700; 384/584
See application file for complete search history.

(56) References Cited

U.S. PATENT DOCUMENTS

| | | | |
|---|---|---|---|
| 5,037,214 A | 8/1991 | Dougherty | |
| 5,494,358 A | 2/1996 | Dougherty | |
| 6,135,643 A | 10/2000 | Hattori et al. | |
| 6,287,015 B1 | 9/2001 | Komaba et al. | |
| 6,581,288 B1 | 6/2003 | Rybkoski et al. | |
| 2007/0025654 A1* | 2/2007 | Shige | 384/448 |

FOREIGN PATENT DOCUMENTS

| | | |
|---|---|---|
| JP | 2003-113839 | 4/2003 |
| JP | 2004-257553 | 9/2004 |
| SU | 806920 | 2/1981 |
| SU | 806920 B * | 2/1981 |
| WO | WO 03/089256 A1 | 10/2003 |
| WO | WO 2006/095773 A1 | 9/2006 |

OTHER PUBLICATIONS

European Search Report dated Jul. 10, 2008.

* cited by examiner

*Primary Examiner* — Derris Banks
*Assistant Examiner* — Azm Parvez
(74) *Attorney, Agent, or Firm* — McGinn IP Law Group, PLLC

(57) ABSTRACT

A rolling bearing assembling method includes: providing a subassembly member in which a cage and an outer ring raceway of an outer ring are combined with each other; disposing a rotary member that includes groove portions formed on an outer circumference thereof, concentrically with the outer ring so that the plurality of groove portions confront respectively pockets of the cage; disposing a guide member including a guide hole, above the rotary member; supplying tapered rollers from the guide hole between the pockets and the groove portions, respectively; rotating the rotary member by a predetermined angle so that the tapered rollers are pushed radially outward by raised portions between the adjacent groove portions thereby accommodating the tapered rollers into the pockets, respectively; providing the seal ring on the inner ring raceway; and assembling the hub main body together with the outer ring.

10 Claims, 14 Drawing Sheets

METHOD AND APPARATUS FOR ASSEMBLING ROLLING BEARING

BACKGROUND OF THE INVENTION

The present invention relates to a method and apparatus for assembling a rolling bearing, and more particularly to a method and apparatus for assembling a double row tapered roller bearing.

A wheel of a motor vehicle is supported rotatably relative to a suspension system on a body side by a rolling bearing, and a wheel of a heavy vehicle such as a bus or a truck in motor vehicles is normally supported by a double row tapered bearing in which tapered rollers are arranged in double rows.

Incidentally, rolling bearings having a construction referred to as a so-called third generation hub unit have been proposed with a view to reducing the number of constituent components to thereby reduce production costs. As is shown in FIG. 10, this hub unit includes a hub main body 51, an inner ring 52 fixedly fitted on one end portion of the hub main body 51, an outer ring 53 provided on an outside diameter side of the inner ring 52 and the hub main body 51, a first row of tapered rollers 54a and a second row of tapered rollers 54b which are provided rollingly between an outer circumferential surface of the inner ring 52 and the hub main body 51 and an inner circumferential surface of the outer ring 53 and a first seal ring 55a and a second seal ring 55b which are adapted to form a seal between inner circumferential surfaces of both end portions of the outer ring 53 and the outer circumferential surface of the hub main body 51 and an outer circumferential surface of an end portion of the inner ring 52 which confronts an inner side of the vehicle (a right-hand side as viewed in FIG. 10). In addition, a flange 56 for mounting a wheel (not shown) is provided at an end portion of the hub main body 51 which confronts an outer side of the vehicle, and on an outer circumferential surface of an intermediate portion of the hub main body, a first inner ring raceway 58a is formed in such a manner as to confront, of the two raceways, that is, the first outer ring raceway 57a and the second outer ring raceway 57b, the first outer ring raceway 57a which is disposed on the outer side of the vehicle (a left-hand side as viewed in FIG. 10). In addition, a second inner ring raceway 58b is formed in such a manner as to confront the second outer ring raceway 57b on an outer circumferential surface of the inner ring 52 fitted on to be fixed to an end portion of the hub main body 51 which confronts the outer side of the vehicle.

The vehicle outer side tapered rollers 54 are arranged circumferentially at equal intervals between the first outer ring raceway 57a and the first inner ring raceway 58a by a cage 60a, and the vehicle inner side tapered rollers 54b arranged circumferentially at equal intervals between the second outer ring raceway 57b and the second inner ring raceway 58b by a cage 60b. In addition, in FIG. 10, reference numeral 59 denotes a splined hole formed in a central portion of the hub main body 51 with which an end portion of a drive shaft or axle (not shown) of the vehicle is brought into spline engagement.

In the hub unit constructed as has been described above, since the flange portion 56 is formed at the vehicle outer side end portion of the hub main body 51, the vehicle outer side seal ring 55a needs to be provided on an inner circumferential surface of the vehicle outer side end portion of the outer ring 53 before the hub main body 51 is inserted into the outer ring 53. Consequently, being different from a conventional double row tapered roller bearing, this hub unit is assembled by a method described, for example, in JP-A-2004-257553.

Namely, as is shown in FIG. 11, firstly, a subassembly member 70 is prepared in which the vehicle outer side cage 60a and the tapered rollers 54a are combined with each other, and this subassembly member 70 is then combined with the outer ring 53. More specifically, the subassembly member 70 is set on the first outer ring raceway 57a.

Following this, the seal ring 55a is fitted in to be fixed to the inner circumferential surface of the vehicle outer side end portion of the outer ring 53 (refer to FIG. 12), and the vehicle inner side end portion of the hub main body 51 is inserted from a vehicle outer side opening of the outer ring 53 in such a state, and the first tapered rollers 54a retained by the cage 60a are provided on the outer circumferential surface of the second inner ring raceway 58b (refer to FIG. 13). Then, although illustration is omitted, the inner ring 52 in which the second tapered rollers 54b are provided on the second inner ring raceway 58b is inserted from the vehicle inner side opening of the outer ring 53, and the inner ring 52 is fitted on to be fixed to the outer circumferential surface of the vehicle inner side end portion of the hub main body 51. Thereafter, the seal ring 55b is fitted in to be fixed to the inner circumferential surface of the vehicle inner side end portion of the outer ring 53, whereby the hub unit can be obtained.

In addition, it is described in Patent Document No. 1 that when assembling the hub unit in the way described above, a cylindrical support table is used to support the tapered rollers 54a from below in the steps shown in FIGS. 11 to 12 with a view to shorten the assembling time and to give a proper preload to the rollers.

According to the assembling method and apparatus described in JP-A-2004-257553, although the assembling time of the hub unit can be shortened more than the other conventional methods and apparatuses, when mounting the tapered rollers on the cage, the worker needs to place a plurality of tapered rollers in pockets of the cage one by one, and this increases the production costs and imposes a limitation on to the efforts to shorten the assembling time.

SUMMARY OF THE INVENTION

The invention has been made in view of these situations, and an object there of is to provide a rolling bearing assembling method and apparatus which enable the automation of assembling work of double row tapered roller bearings so as to enable an efficient and short-time assemblage of such tapered roller bearings.

According to an aspect of the invention, there is provided a method of assembling a double row tapered roller bearing which includes; an outer ring including a first outer ring raceway and a second outer ring raceway on an inner circumferential surface thereof; a hub main body including a first inner ring raceway which confronts the first outer ring raceway and including a radially outwardly projecting flange at one end portion thereof; an inner ring that includes a second inner ring raceway which confronts the second outer ring raceway and is fitted on an outer circumferential surface of the other end portion of the hub main body; a row of tapered rollers which are provided rollably between the first inner ring raceway and the first outer ring raceway; a cage that includes a plurality of pockets for arranging the row of tapered rollers at equal intervals along a circumferential direction; and a seal ring provided on an inner circumferential surface of an end portion of the outer ring which lies on a side close to the first outer ring raceway, the method comprising:

providing a subassembly member in which the cage and the first outer ring raceway of the outer ring are combined with each other;

disposing a rotary member that includes a plurality of groove portions formed on an outer circumference thereof, concentrically with the outer ring so that the plurality of groove portions confront respectively inner circumferential sides of the pockets;

disposing a guide member including a guide hole, above the rotary member;

supplying the tapered rollers through the guide hole between the pockets and the groove portions, respectively;

rotating the rotary member by a predetermined angle so that the tapered rollers are pushed radially outward by raised portions between the adjacent groove portions thereby accommodating the tapered rollers into the pockets, respectively;

providing the seal ring on the inner circumferential surface of the end portion of the outer ring; and assembling the hub main body together with the outer ring so that the tapered rollers are rollably disposed between the first inner ring raceway and the first outer ring raceway.

In the rolling bearing assembling method of the aspect of the invention, in the first step in which the subassembly member in which the first case and the first outer ring raceway of the outer ring are combined with each other and the first row of tapered rollers are combined together into the first step member, the rotatably rotary member in which the plurality of groove portions are formed on the outer circumference thereof is provided concentrically with the outer ring and in such a manner that the plurality of groove portions confront respectively the inner circumferential sides of the plurality of pockets of the first cage into which the tapered rollers are accommodated. Following this, the guide member in which the guide hole is formed through which the tapered rollers are supplied is provided above the rotary member, so that the tapered rollers are supplied from the guide hole between the pockets and the guide grooves. By causing the tapered rollers to move downwards through the guide hole formed in the guide member in that way, the tapered rollers can be supplied into spaces lying close to the pockets of the cage.

In addition, in the assembling method of the invention, the rotary member is caused to rotate by the predetermined angle to push radially outwards the tapered rollers so supplied by the raised portions formed between the adjacent groove portions, whereby the tapered rollers are accommodated inside the pockets. The supply of the tapered rollers into the guide hole can automatically be implemented using, for example, a parts feeder, and by rotating the rotary member by a suitable driving device after the tapered rollers are supplied into the respective guide holes, the tapered rollers can be provided within the pockets of the cage. In this way, according to the assembling method of the invention, the provision of tapered rollers into the pockets of the case, which has been manually implemented, can be automated, thereby making it possible not only to simplify the bearing assembling work but also to shorten the working time.

In addition, according to another aspect of the invention, there is provided an apparatus for use in assembling a double row tapered roller bearing which includes: an outer ring including a first outer ring raceway and a second outer ring raceway on an inner circumferential surface thereof; a hub main body including a first inner ring raceway which confronts the first outer ring raceway and including a radially outwardly projecting flange at one end portion thereof; an inner ring that includes a second inner ring raceway which confronts the second outer ring raceway and is fitted on an outer circumferential surface of the other end portion of the hub main body; a row of tapered rollers which are provided rollably between the first inner ring raceway and the first outer ring raceway; a cage that includes a plurality of pockets for arranging the row of tapered rollers at equal intervals along a circumferential direction; and a seal ring provided on an inner circumferential surface of an end portion of the outer ring which lies on a side close to the first outer ring raceway, the apparatus comprising:

a support member on which the outer ring is placed with the first outer ring raceway side thereof oriented upwards; and a supply member disposed above the support member and adapted to supply the tapered rollers onto the outer ring, wherein the support member includes:

an outer cylindrical portion including a first annular stepped portion on which the outer ring is to be placed and which is formed on an outer circumferential surface at an upper end portion thereof; and a cylindrical support portion that is disposed so as to move axially in an interior of the outer cylindrical portion and includes a second annular stepped portion formed on an outer circumferential surface at an upper end portion thereof on which the tapered rollers are to be placed, and wherein the supply member includes;

a guide member including a guide hole through which the tapered rollers are transferred; and a rotary member disposed concentrically with the support portion below the guide member, and including an engagement portion which is brought into engagement with the upper end portion of the support portion, and a plurality of groove portions formed on an outer circumferential surface thereof, wherein the rotary member is configured to be rotated relative to the guide member so that raised portions between the adjacent groove portions push radially outwards the tapered rollers disposed on the second stepped portion.

In the assembling apparatus of the invention, by causing the tapered rollers to move downwards through the guide hole formed in the guide member, the tapered rollers can be supplied to the spaces lying close to the pockets of the cage. In addition, the rotary member is caused to rotate by the predetermined angle to push radially outwards the tapered rollers so supplied by the raised portions formed between the adjacent groove portions, whereby the tapered rollers are accommodated inside the pockets. The supply of the tapered rollers into the guide hole can automatically be implemented using, for example, a parts feeder, and by rotating the rotary member by a suitable driving device after the tapered rollers are supplied into the respective guide holes, the tapered rollers can be provided within the pockets of the cage. In this way, according to the assembling apparatus of the invention, the provision of tapered rollers into the pockets of the case, which has been manually implemented, can be automated, thereby making it possible not only to simplify the bearing assembling work but also to shorten the working time.

According to the tolling bearing assembling method and apparatus of the invention, the automation of assembling work of double row tapered roller bearings can be enabled, thereby making it possible to assemble double row tapered roller bearings with good efficiency and within a short period of time.

DETAILED DESCRIPTION OF PREFERRED EMBODIMENTS

Hereinafter, referring to the accompanying drawings, embodiments of a rolling bearing assembling method and assembling apparatus according to an embodiment of the invention will be described in detail.
Structure of Assembling Apparatus Firstly, the structure of a rolling bearing assembling apparatus according to an embodiment of the invention will be described.

Figure 10:
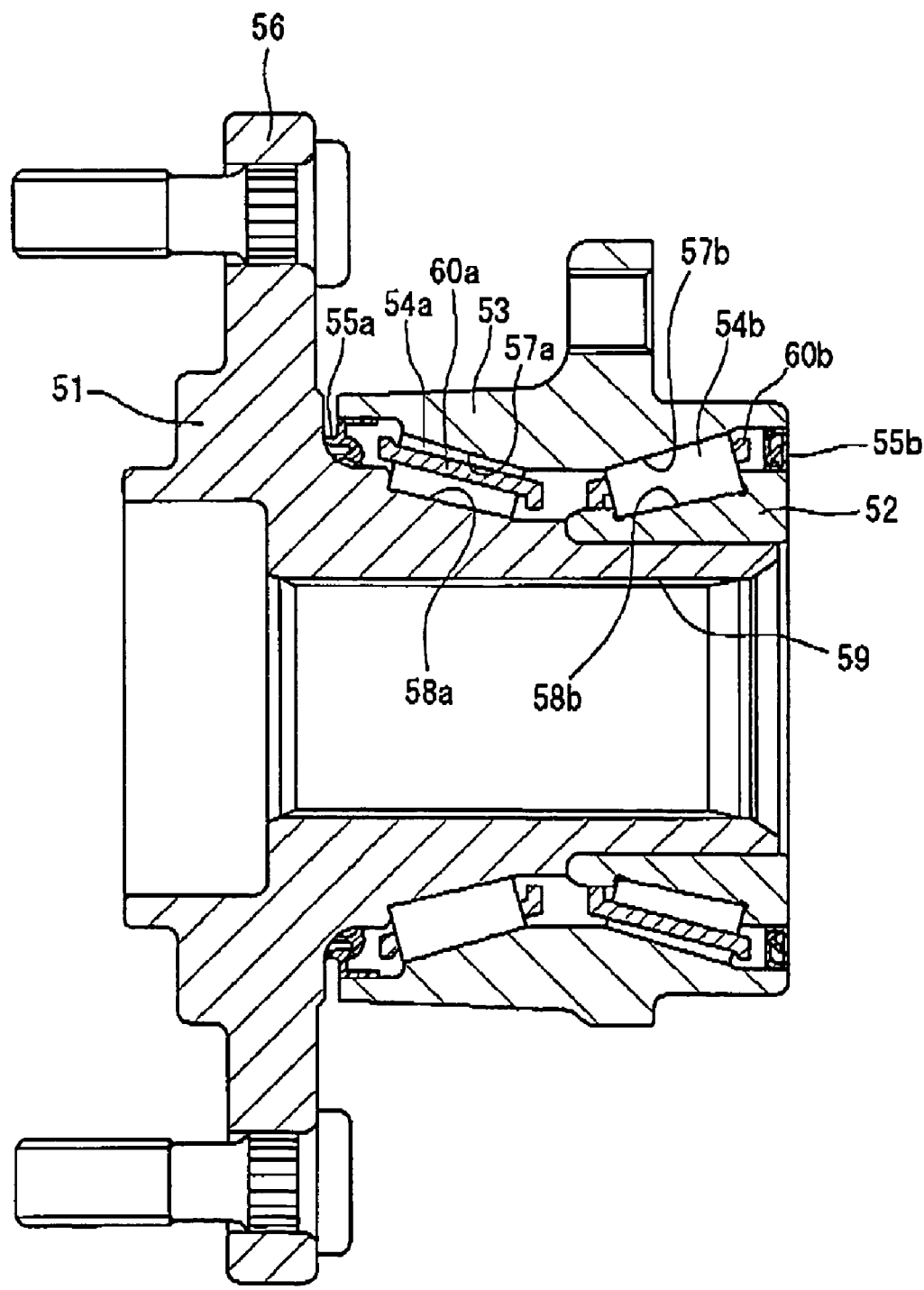
FIG. 10 is an explanatory sectioned side view of an example of a double row tapered roller bearing.
Figure 11:
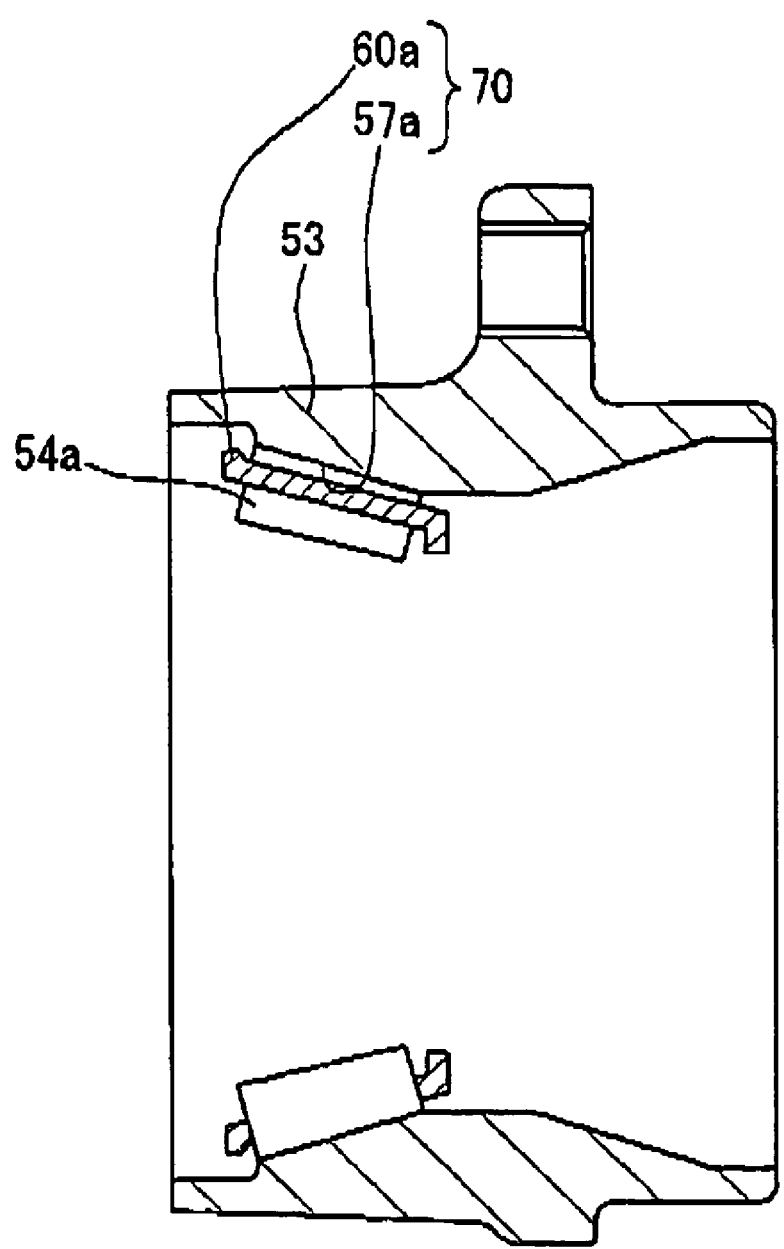
FIG. 11 is an explanatory diagram of the assembling method of a roller bearing shown in FIG. 9.
Figure 12:
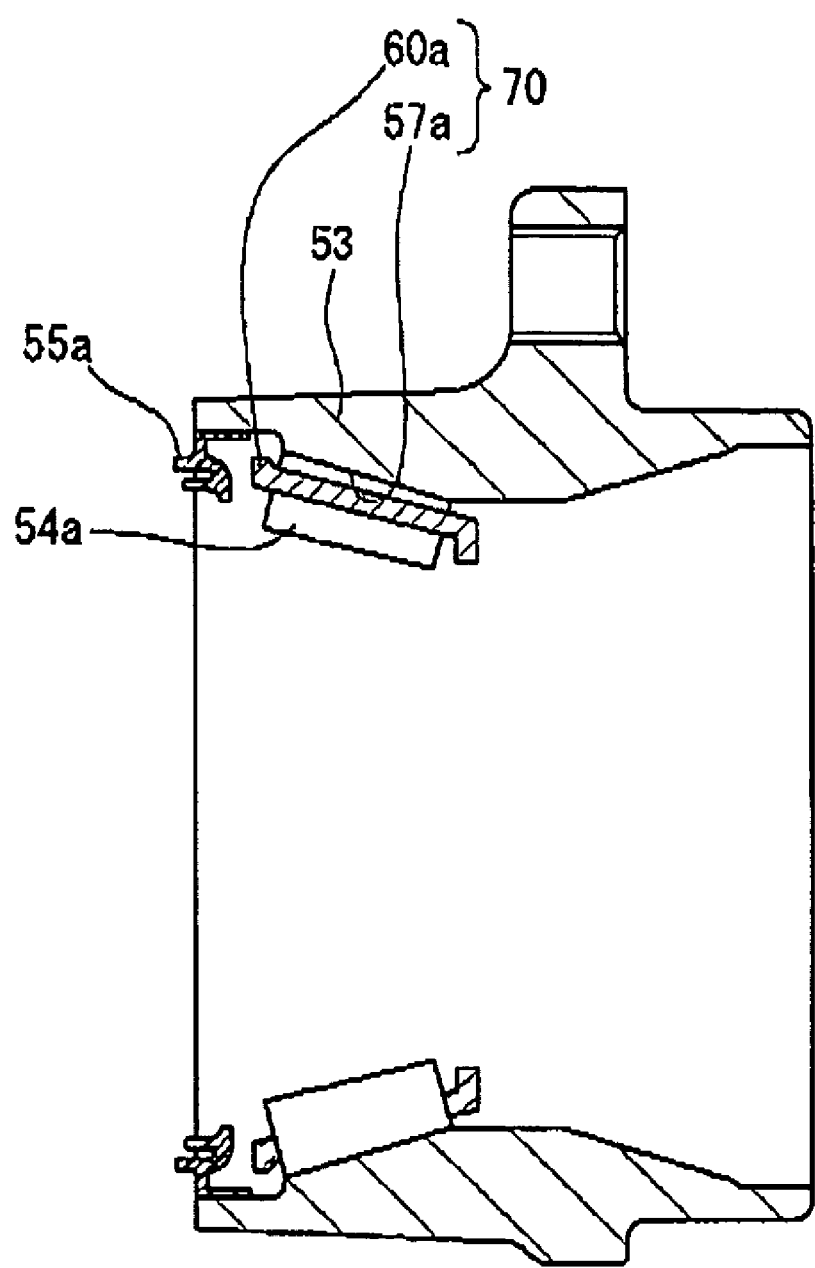
FIG. 12 is an explanatory diagram of the assembling method of a roller bearing shown in FIG. 9.
Figure 13:
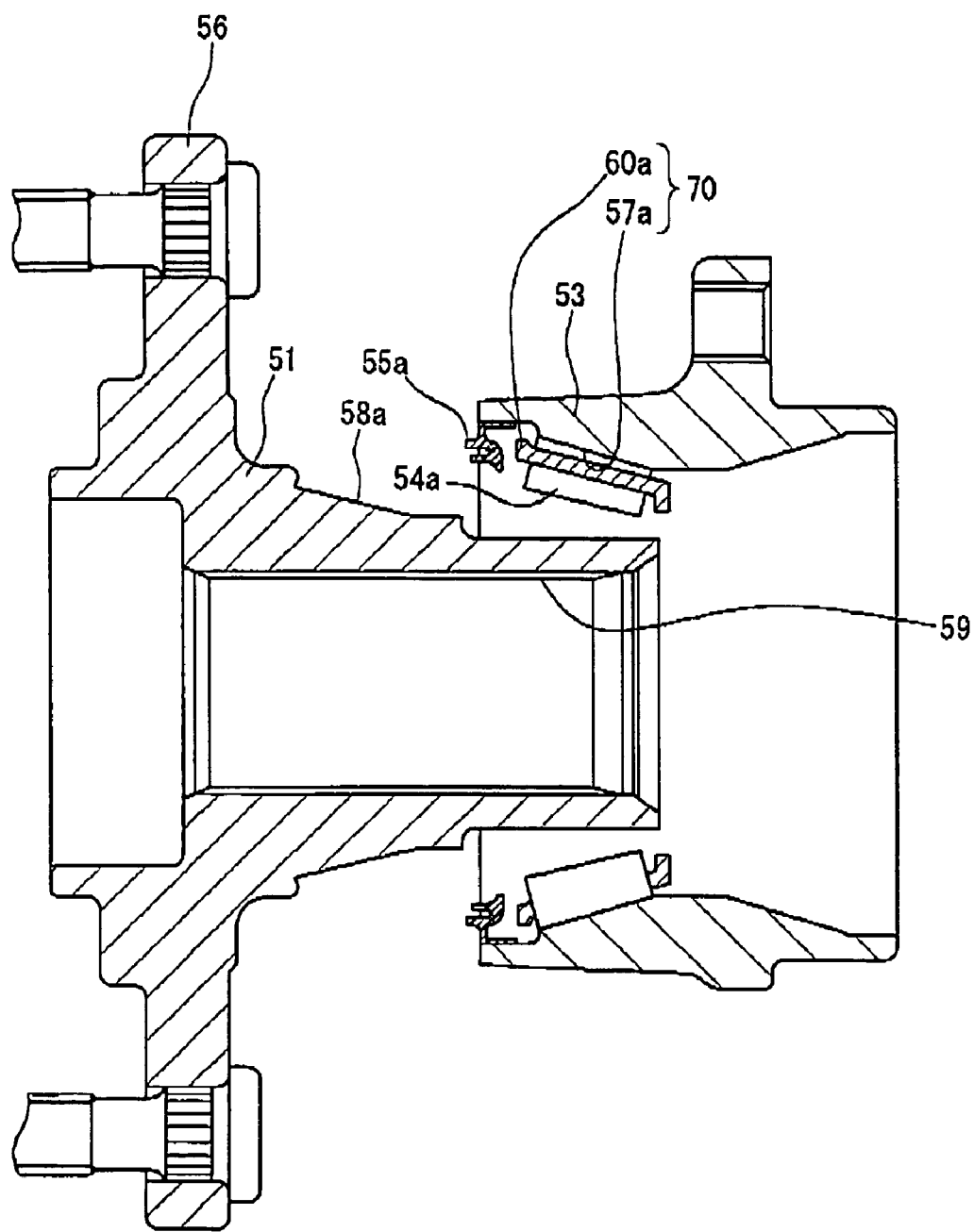
FIG. 13 is an explanatory diagram of the assembling method of a roller bearing shown in FIG. 9.

Note that since a basic structure of a rolling bearing that is to be assembled by an assembling apparatus of the invention is similar to that shown in FIG. 10, reference numerals given to constituent components thereof will be also used for description.

In addition, since the assembling apparatus of the invention is such as to perform assembling steps of assembling, in the plurality of components which make up the rolling bearing shown in FIG. 10, the hub main body 51, the outer ring 53, the tapered roller bearings 54a, the cage 60a, and the seal ring 55a, the description of the constituent components of the rolling bearing other than the components described above will be omitted.

A rolling bearing that is assembled by the assembling apparatus of the invention has an outer ring 53 having on an inner circumferential surface thereof an outer ring raceway 57a (a first outer ring raceway) and an outer ring raceway 57b (a second outer ring raceway), a hub main body 51 having an inner ring raceway 58a (a first inner ring raceway) which confronts the outer ring raceway 57a and having a radially outwardly projecting flange 56 at one end portion thereof, a plurality of tapered rollers 54a (a first row of tapered rollers) which are provided rollingly between the inner ring raceway 58a and the outer ring raceway 57a, a cage 60a (a first cage) which includes a plurality of pockets for arranging the tapered rollers circumferentially at equal intervals and a seal ring 55a (a first seal ring) provided on an inner circumferential surface of an end portion of the outer ring which lies on a side close to the outer ring raceway 57a.

As is shown in FIGS. 1 to 6, the assembling apparatus of the embodiment includes a support member A on which the outer ring 53 of the rolling bearing is placed with its outer ring raceway side oriented upwards and a supply member B disposed above the support member A and adapted to supply the tapered rollers 54a to the outer ring 53.

Figure 1:
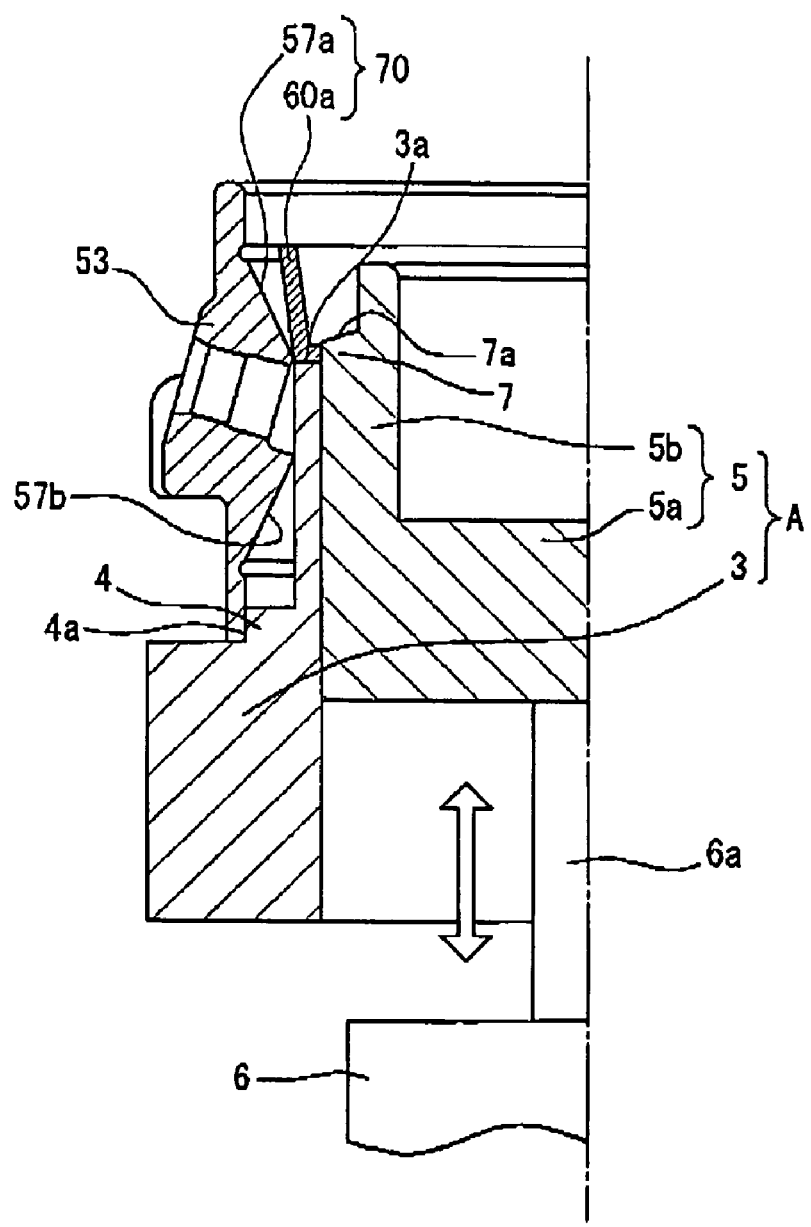
FIG. 1 is an explanatory diagram of an assembling method of a roller bearing of the invention.

As is shown in FIG. 1, the support member A is formed into a short cylindrical body and is made up of an outer cylindrical portion 3 which is provided on a base, not shown, in such a manner that an axis of the short cylindrical body extends along a vertical axis and a support portion 5 which is disposed in such a manner as to move axially in an interior of the outer cylindrical portion 3.

A first annular stepped portion 4 is formed on an outer circumferential surface of an upper end portion of the outer cylindrical portion 3, and the outer ring 53 is placed on this annular stepped portion 4. This stepped portion 4 is formed in such a manner that an inner circumferential surface of a vehicle inner side end portion of the outer ring 53 is brought into abutment with a side 4a of the stepped portion 4. In addition, the stepped portion 4 is formed by selecting its axial position such that the whole of the outer ring raceway 57a projects further outwards than an upper end 3a of the outer cylindrical portion 3.

The support portion 5 is provided concentrically with the outer cylindrical portion 3 in such a manner as to slide along an inner circumferential surface of the outer cylindrical portion 3. The support portion 5 is made up of a disc-shaped base portion 5a and a cylindrical placing portion 5b which is provided along a circumferential edge of an upper surface of the base portion 5a in such a manner as to erect therefrom. A leading end of a piston 6a in a hydraulic cylinder 6 is brought into connection with a center of a lower surface of the base portion 5a, and the support portion 5 is made to be moved along an axial direction thereof by driving the piston 6a in the hydraulic cylinder 6.

A second annular stepped portion 7 is formed on an outer circumferential surface of an upper end portion of the placing portion 5b of the support portion 5, and the tapered rollers 54a are adapted to be place on this second annular stepped portion 7. An upper surface 7a of the second annular stepped portion 7 is made into a sloping surface which descends outwards. The tapered rollers are supplied from guide holes in a guide member, which will be described later, to thereby be accommodated in a space defined above the stepped portion 7.

In addition, the supply member B is made up of a guide member 9 in which guide holes 9a are formed through which the tapered rollers 54a are transferred (supplied) and a rotary member 8 disposed concentrically with the support portion 5 below the guide member 9.

Figure 4B:
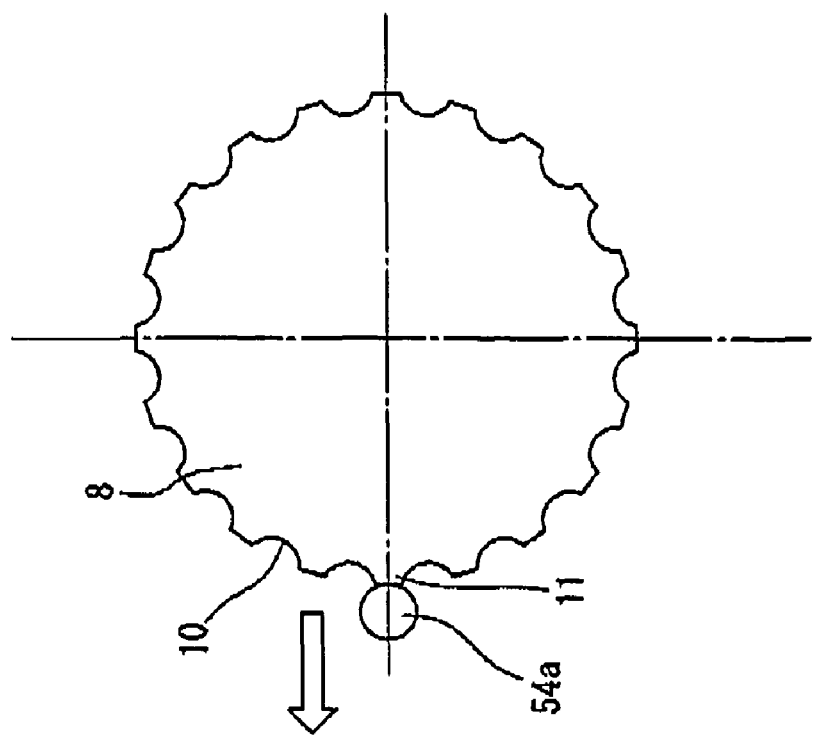
FIGS. 4A and 4B are explanatory plan views showing a relationship between a tapered roller and a rotary member.
Figure 4A:
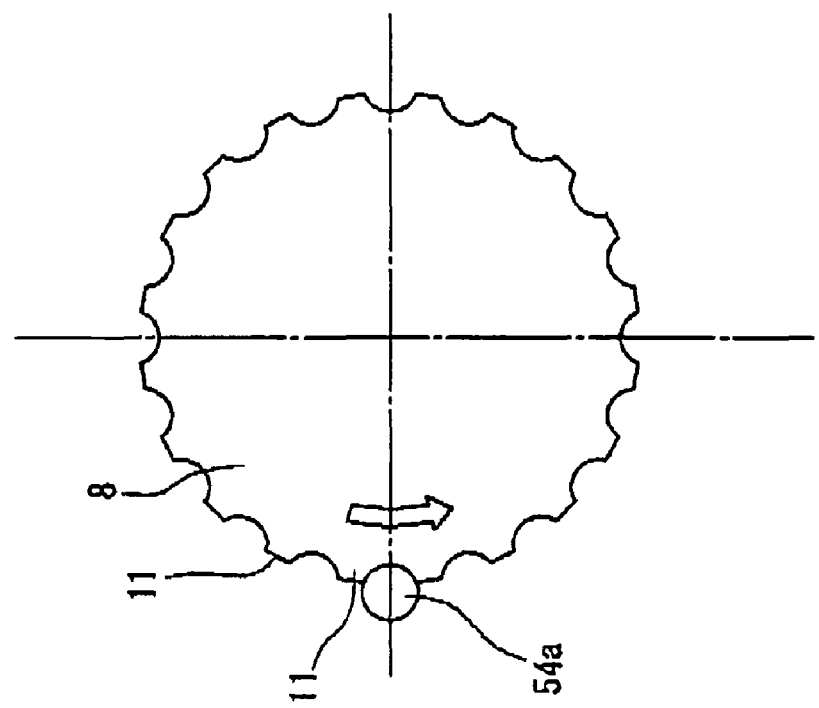
Figure 5A:
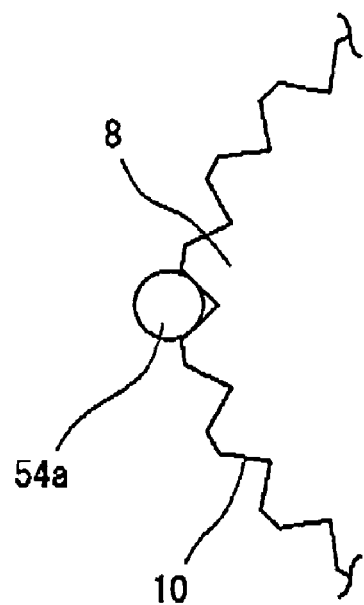
FIGS. 5A and 5B are explanatory plan views showing another example of a groove portion formed on an outer circumferential surface of the rotary member.
Figure 5B:
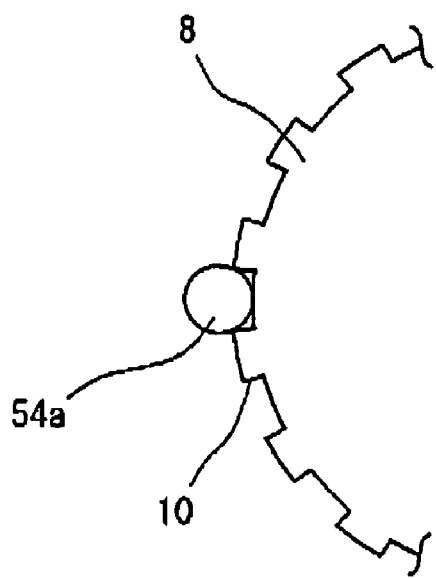

The rotary member 8 is made up of a rotatable disk-shaped member, and an annular notched portion 8a is formed on an outer circumference of a lower portion thereof. This notched portion 8a is formed in such a manner as to be brought into engagement with a thin portion 5c (an upper portion) at a distal end of the placing portion 5b. In addition, a plurality of groove portions 10 are formed circumferentially at equal intervals and each of the groove portions 10 is formed into a shape which corresponds to a circumferential surface of the tapered roller 54a. As is shown in FIGS. 4A and 4B, a section of the groove portion 10 which is vertical to an axial direction thereof is formed into a substantially arc shape which corresponds to the circumferential surface of the tapered roller 54a. In addition, the cross sectional shape of the groove portion which is vertical to the axial direction is not limited to the substantially arc shape shown in FIGS. 4A and 4B and hence may be formed into other shapes, for example, into a substantially V shape as is shown in FIG. 5A or into a substantially rectangular shape as is shown in FIG. 5B, provided that the groove portion 10 can position the tapered roller 54 which falls down along the guide hole 9a and push the tapered roller 54 outwards.

The guide member 9 is made up of a short cylindrical member which is provided concentrically with the rotary member 8, and a plurality of guide holes 9a, through which the tapered rollers 54a can move vertically along the axial direction, are formed circumferentially at equal intervals. The number of pockets 60c in the cage 60 is the same as those of the guide holes 9a and the groove portions 10.

In addition, a mounting hole 21 is formed in the guide member 9 in such a manner as to pass therethrough in the axial direction, and a rotational shaft 20 adapted to impart a rotating force to the rotary member 8 is mounted in this mounting hole 21. The rotational shaft 20 is rotatably supported by a bearing 22 in this mounting hole 21.

The rotary member 8 and the guide member 9 can move along the axial direction. Relative to the support member A which is made up of the outer cylindrical portion 3 and the support member 5, it is configured such that the rotary member 8 is firstly provided above the support member 5, and following this, the guide member 9 is provided above the rotary member 8. The position where the cage 60a is provided on the outer ring raceway 57a is set such that the groove portion 10 formed on the outer circumferential surface of the rotary member 8 and pockets 62 of the cage 60a confront each other. In addition, the guide holes 9a, the groove portions 10 and the spaces above the stepped portion 7 are made to communicate vertically with each other, and the position of the rotary member 8 and the guide member 9 about the axis is set such that the tapered rollers 54a falling down along the guide holes 9a pass through the groove portions 10 to thereby be accommodated in the spaces above the stepped portion 7 in a smooth fashion.

Assembling Steps of Bearing

Next, an embodiment of a rolling bearing assembling method of the invention will described.

Figure 7:
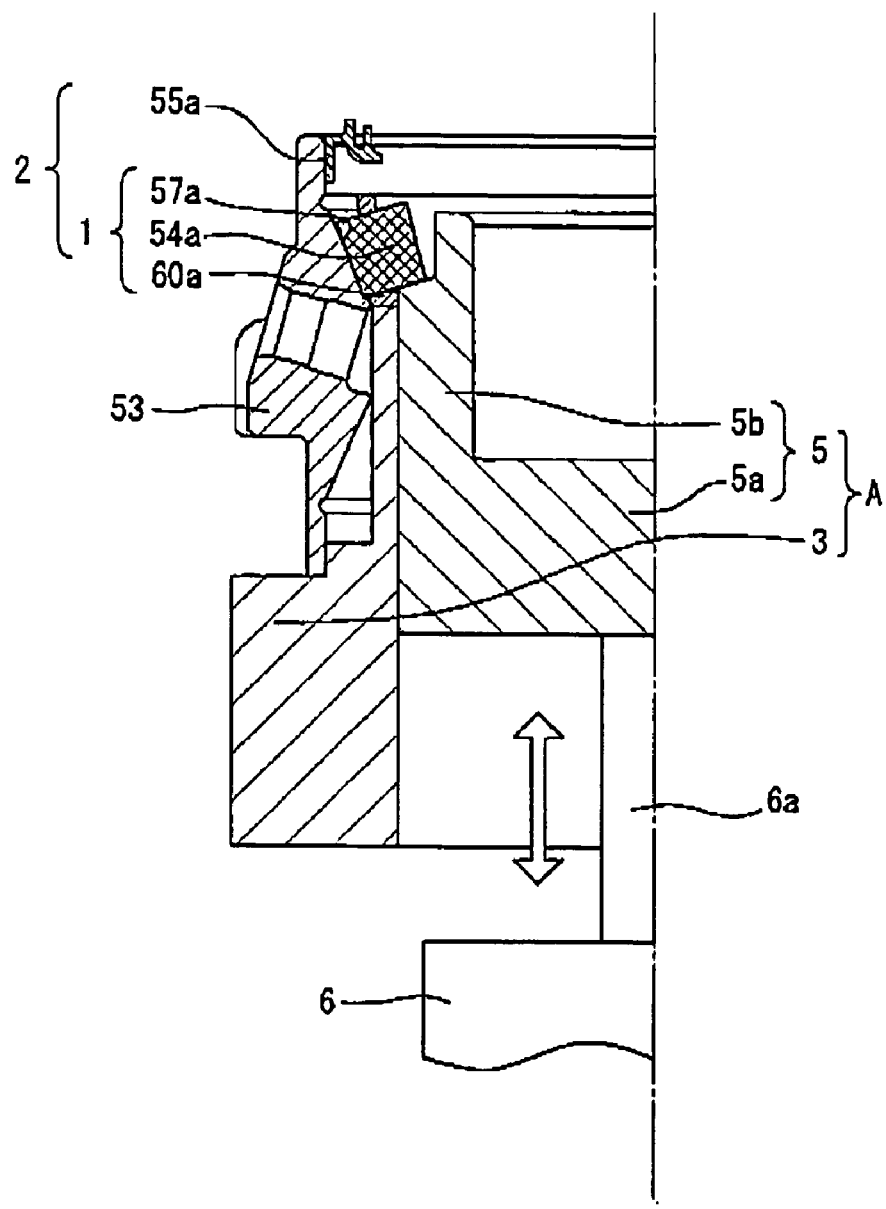
FIG. 7 is an explanatory diagram of an assembling method of a roller bearing of the invention.
Figure 8:
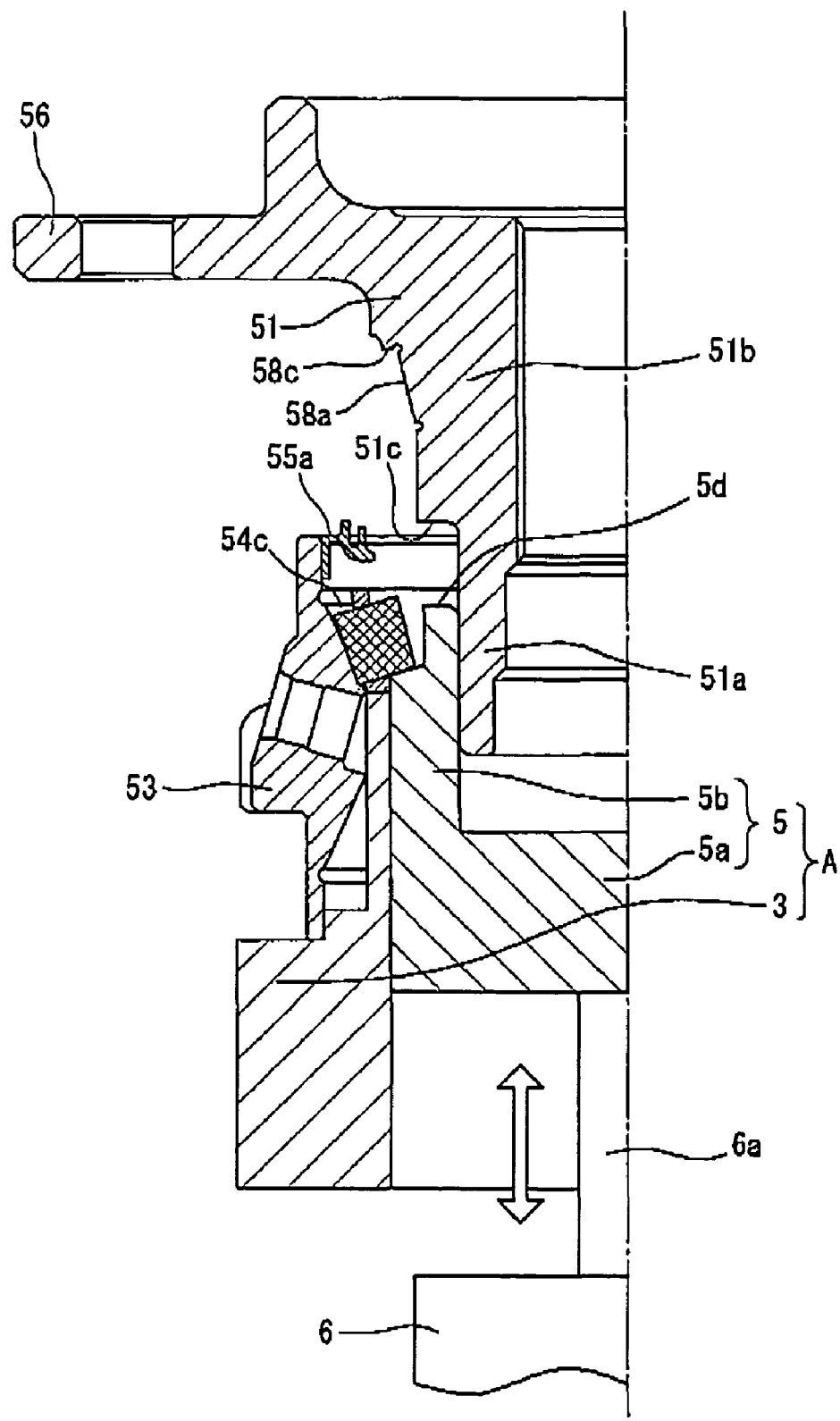
FIG. 8 is an explanatory diagram of an assembling method of a roller bearing of the invention.
Figure 9:
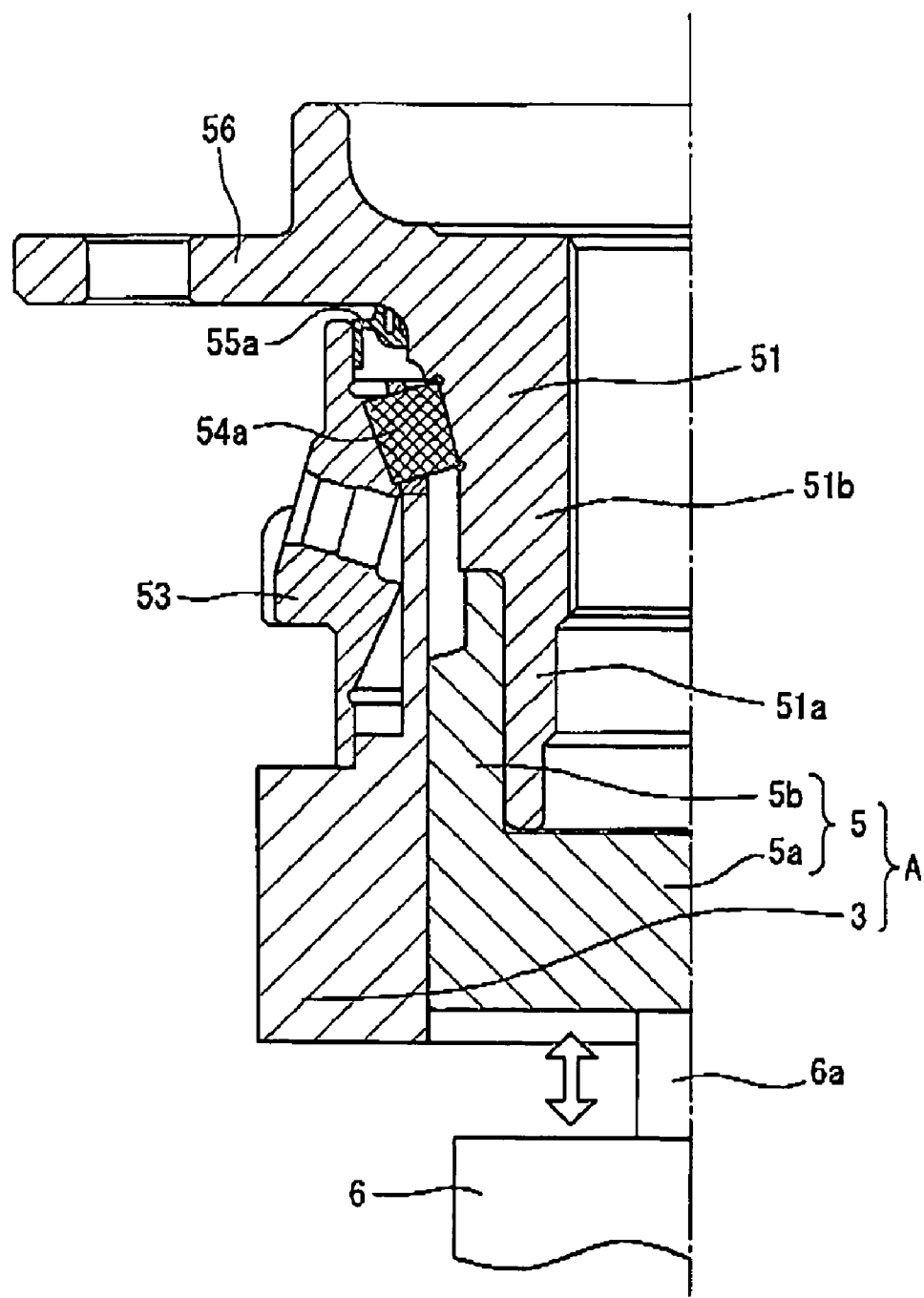
FIG. 9 is an explanatory diagram of the assembling method of a roller bearing of the invention.

An assembling method of the invention includes a first step for assembling a subassembly member 70 in which the cage 60a and the outer ring raceway 57a are combined with each other, and the tapered rollers 54a together so as to be formed into a first step member 1 (FIGS. 1 to 6), a second step in which the seal ring 55a is provided on the first step member 1 so as to be formed into a second step member 2 (FIG. 7) and a third step in which the second step member 2 is combined with the hub main body 51 (FIGS. 8 to 9). Hereinafter, the first to third steps will be described sequentially.

Figure 14:
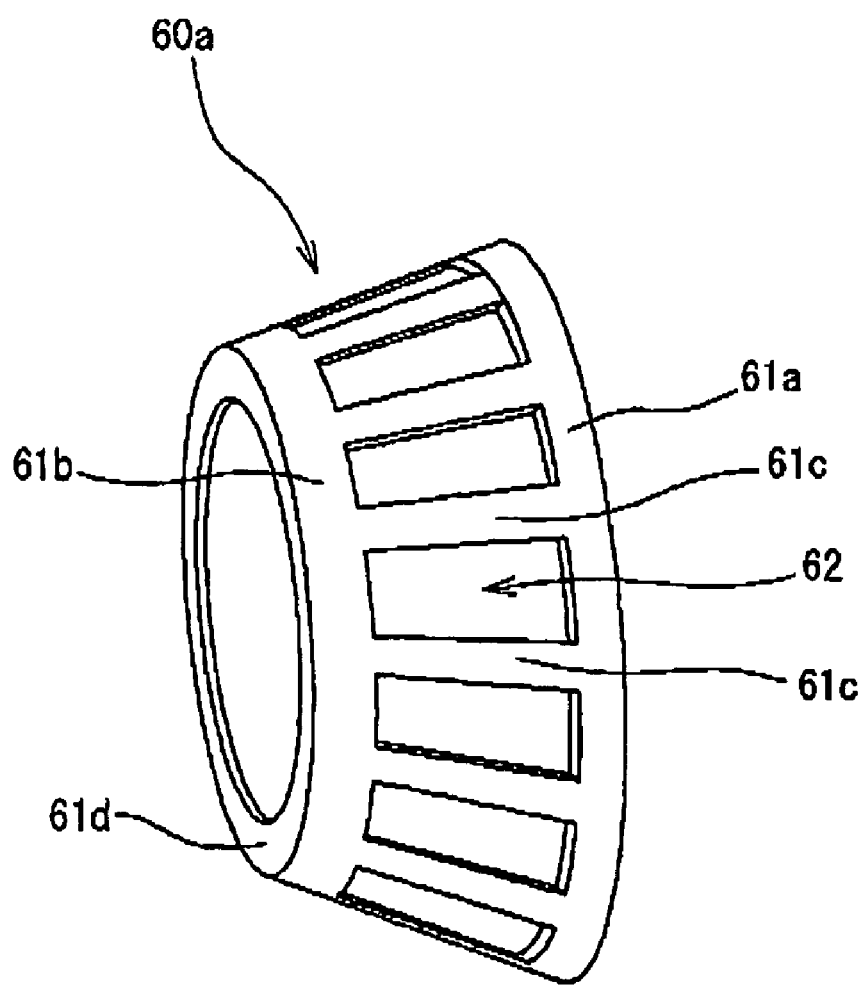
FIG. 14 is an explanatory perspective view of an example of a cage that can be used in the invention.

Firstly, in the first step, the cage 60a and the outer ring raceway 57a are combined together into the subassembly member 70 (refer to FIG. 1). In the invention, there is no specific limitation imposed on the cage 60a, and hence, a cage can be adopted which is normally used in a double row tapered roller bearing. For example, as is shown in FIG. 14, a cage can be used which is made up of a pair of spaced apart annular portions, that is, a large annular portion 61a which lies on a large diameter side and a small annular portion 61b which lies on a small diameter side, and a plurality of pillar portions 61c which are provided in such a manner as to extend between both the annular portions 61a, 61b, and an annular rib portion 61d which is provided in such a manner as to extend radially inwards from a radially inward end portion of the small annular portion 61b, to thereby exhibit a substantially conical surface shape. In addition, in this cage 60a, a plurality of trapezoidal window-like pockets 62 are provided between the adjacent pillar portions 61c at equal intervals in such a manner that the tapered rollers 54a can be accommodated therein.

The outer ring 53 is provided on an outer circumference of an upper portion of the outer cylindrical portion 3 in such a manner that the outer ring raceway is positioned on an upper side thereof. More specifically, the outer ring 53 is provided in such a manner that an inner circumferential surface of a vehicle inner side end portion of the outer ring 53 is brought into abutment with the side 4a of the first annular stepped portion 4 on the outer cylindrical portion 3.

Figure 2:
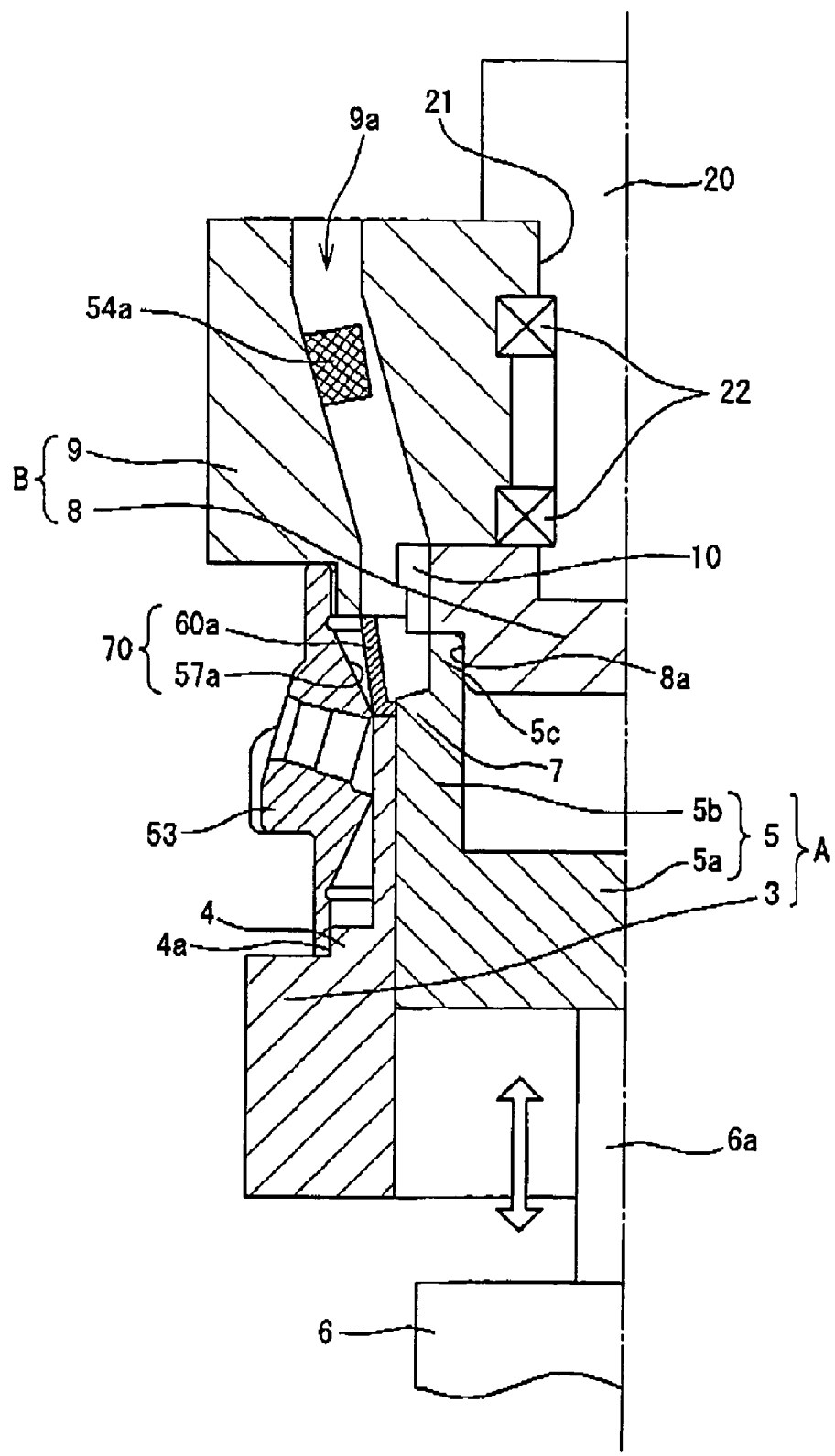
FIG. 2 is an explanatory diagram of the assembling method of a roller bearing of the invention.

Following this, after the subassembly member 70 is prepared by providing the cage 60a on the outer ring raceway 57a of the outer ring 53, as is shown in FIG. 2, the rotary member 8 and the guide member 9 are provided in this order above the support portion 5. Namely, after the step shown in FIG. 1 is completed, the rotary member 8 is provided above the support member 5, and the guide member 9 is then provided above the rotary member 8. As this occurs, the position where the cage 60a is provided on the outer ring raceway 57a is set such that the groove portions 10 formed on the outer circumferential surface of the rotary member 8 and the pockets 62 of the cage 60a confront each other. In addition, the guide holes 9a, the groove portions 10 and the spaces above the second stepped portion 7 are made to communicate vertically with each other, and the position of the rotary member 8 and the guide member 9 about the axis is set such that the tapered rollers 54a falling down along the guide holes 9a pass through the groove portions 10 to thereby be accommodated in the spaces above the stepped portion 7 in a smooth fashion.

Figure 3:
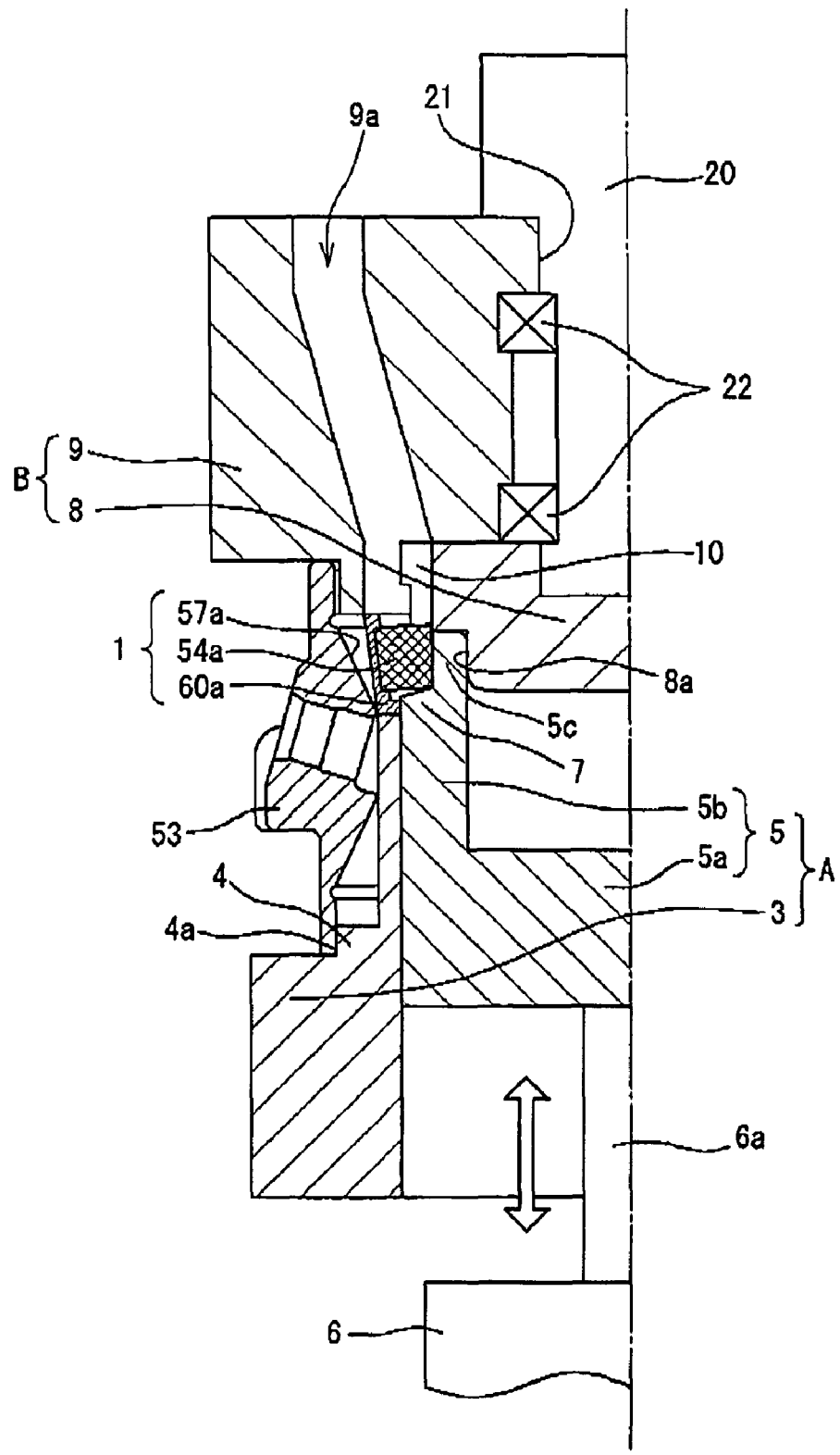
FIG. 3 is an explanatory diagram of the assembling method of a roller bearing of the invention.

As is shown in FIG. 2, after the rotary member 8 and the guide member 9 have been provided above the support portion 5, when the tapered rollers 54a are supplied into the guide holes 9a in the guide member 9 by means of a parts feeder (not shown) or the like, the tapered rollers 54a are accommodated in the space above the second stepped portion 7 by way of the guide holes 9a and the groove portions 10 (refer to FIG. 3). As this occurs, as is shown in FIG. 4A, the tapered rollers 54a are in such a state that part of a circumferential surface thereof is fitted in the groove portion 10.

Figure 6:
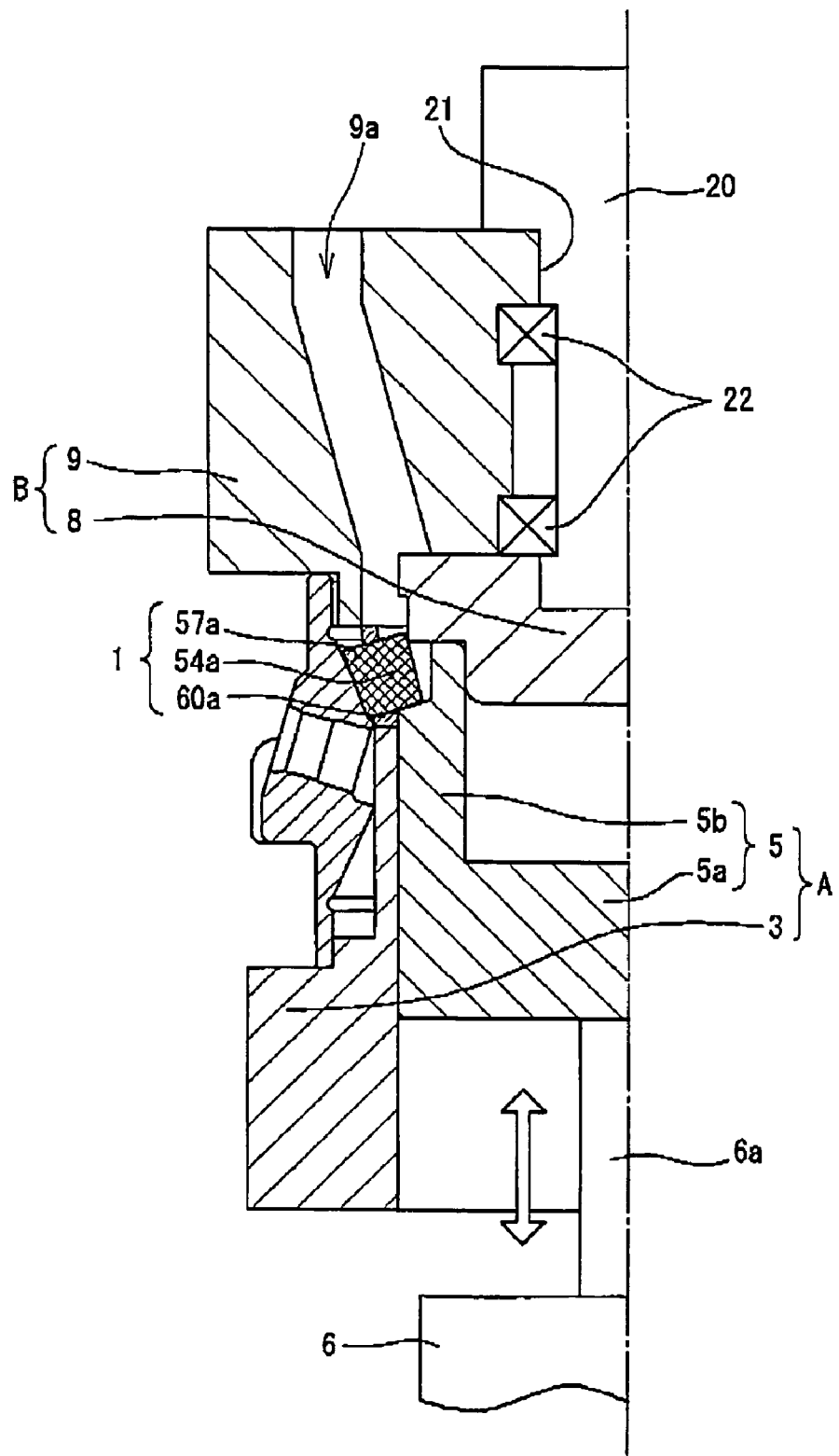
FIG. 6 is an explanatory diagram of the assembling method of a roller bearing of the invention.

Following this, when the rotary member 8 is caused to rotate by a predetermined angle (for example, an angle corresponding to one half of the pitch of the groove portions 10), the tapered roller 54a is, as is shown in FIG. 4B, then pushed out radially outwards by a raised portion 11 defined between the adjacent groove portions 10, so as to be accommodated within the pocket 60c of the cage 60a (refer to FIG. 6). In this way, the first step member 1 is completed in which the tapered rollers 54a are accommodated, respectively, in the pockets 60c of the cage 60a disposed on the outer ring raceway 57a, and the first step of the invention ends.

In this first step, as has been described before, the tapered rollers 54a can be supplied to the space above the stepped portion 7 which lies close to the pockets 60c of the cage 60a by causing the tapered rollers 54a to fall down along the guide holes 9a formed in the guide member 9. In addition, the tapered rollers 54a so supplied are pushed out radially outwards by the raised portions 11 defined between the adjacent groove portions 10 so as to allow the tapered rollers 54a to be accommodated in the pockets 60c by causing the rotary member 8 to rotate by the predetermined angle. In this way, according to the assembling method of the invention, the provision of the tapered rollers 54a into the pockets 60c of the cage 60a, which has been manually implemented in the conventional assembling methods, can be automated, there by making it possible not only to simplify the assembling work of roller bearings but also to shorten the working time.

After the first step has been completed, the rotary member 8 and the guide member 9 are withdrawn upwards, and as is shown in FIG. 7, the seal ring 55a is provided on an inner circumferential surface of an upper end of the outer ring 53 which is made to open, and the second step member 2 is completed (the second step).

Following this, the hub main body 51 is inserted from above the outer ring 53 into the outer ring 53 in such a state that a vehicle inner end portion of the hub main body 51 is oriented downwards (the third step, FIGS. 8 to 9). As this occurs, an inside diameter of the placing portion 5*b* is set such that an outer circumferential surface of a vehicle inner side small diameter portion 51*a* of the hub main body 51 can slide against an inner surface of the placing portion 5*b* of the support portion 5, whereby the positioning between the hub main body 51 and the second step member 2 can be implemented with high accuracy.

When the hub main body 51 is lowered, a boundary surface between the small diameter portion 51*a* and a large diameter portion 51*b* of the hub main body 51 are brought into abutment with an upper end face 5*d* of the placing portion 5*b* of the support portion 5. In addition, when it is detected by detection devices (not shown) provided on the support portion 5 and the hydraulic cylinder 6 such as a displacement sensor, a proximity sensor and a load cell that the boundary surface 51 has reached the abutment position with the upper end face 5*d*, the hydraulic cylinder 6 is driven by the detection signal so as to drive to withdraw the piston 6*a* in synchronism with the lowering action of the hub main body 51. Note that the hub main body 51 may be pushed in with a larger force than the supporting force of the hydraulic cylinder 6 without driving to withdraw the hydraulic cylinder 6 in response to the detection signal from the detection device.

In addition, as the device for moving the support portion 5 in the axial direction, a pneumatic cylinder or a mechanism in which a motor is combined with a ball screw can be used in place of the hydraulic cylinder 6. Furthermore, without using the drive device, the support portion may be configured to be supported while being biased from below by means of an elastic device such as a coil spring. In this case, the state shown in FIGS. 1 to 7 is taken as the reference position (a state in which the weight of the support member is balanced with the biasing force of the spring), and in the state shown in FIGS. 8 to 9, the hub main body 51 is lowered downwards against the biasing force of the spring.

In addition, when the tapered rollers 54*a* are brought into contact with the inner ring raceway 57*a* and the hub main body 51 is lowered to the position where the large diameter side end faces 54*c* of the tapered rollers 54*a* are brought into abutment with a large collar surface 58*c* of the inner ring raceway 58*a*, the hub main body 51 and the support portion 5 come to a halt, and the third step is completed.

Following this, only the support portion 5 is withdrawn further downwards, although not shown, the inner ring 52 in which the tapered rollers 54*b* are disposed on the inner ring raceway 58*b* is inserted into a space that is produced on an outer circumference of the small diameter portion 51*a* of the hub main body 51 by the further withdrawal of the support portion 5, and the inner ring 52 is fitted on to be fixed to the outer circumference of the small diameter portion 51*a*, thereafter, the seal ring 55*b* being fitted in to be fixed to the inner circumferential surface of the vehicle inner side end portion of the outer ring 53, the rolling bearing being thereby obtained.

In addition, in the third step, the support portion 5 and the hub main body 51 may be lowered while being caused to rotate about the center axis relative to the outer cylindrical portion 3. By this structure, when the tapered rollers 54*a* and the inner ring raceway 58*a* are brought into contact with each other, the contact surfaces of both the members are allowed to be in contact comfortably to thereby prevent the damage that would otherwise be made to the surfaces of both the members.

In addition, the assembling method and assembling apparatus of the invention can be applied to not only the bearing for the driving wheel but also to a bearing for a driven wheel.

What is claimed is:

1. A method of assembling a double row tapered roller bearing which includes an outer ring including a first outer ring raceway and a second outer ring raceway on an inner circumferential surface thereof, a hub main body including a first inner ring raceway which confronts the first outer ring raceway and including a radially outwardly projecting flange at one end portion thereof, an inner ring that includes a second inner ring raceway which confronts the second outer ring raceway and is fitted on an outer circumferential surface of the other end portion of the hub main body, a row of tapered rollers which are provided rollably between the first inner ring raceway and the first outer ring raceway, a cage that includes a plurality of pockets for arranging the row of tapered rollers at equal intervals along a circumferential direction, and a seal ring provided on an inner circumferential surface of an end portion of the outer ring which lies on a side close to the first outer ring raceway, the method comprising:

providing a subassembly member in which the cage and the first outer ring raceway of the outer ring are combined with each other;

disposing a rotary member that includes a plurality of groove portions formed on an outer circumference thereof, concentrically with the outer ring so that the plurality of groove portions confront respectively inner circumferential sides of the pockets;

disposing a guide member including a guide hole, above the rotary member;

supplying the tapered rollers through the guide hole between the pockets and the groove portions, respectively;

rotating the rotary member by a predetermined angle, after providing the sub assembly member in which the cage and the first outer ring raceway of the outer ring are combined with each other, so that the tapered rollers are pushed radially outward by raised portions between the adjacent groove portions thereby accommodating the tapered rollers into the pockets, respectively;

providing the seal ring on the inner circumferential surface of the end portion of the outer ring; and assembling the hub main body together with the outer ring so that the tapered rollers are rollably disposed between the first inner ring raceway and the first outer ring raceway.

2. The method according to claim 1, wherein, in the assembling of the hub main body together with the outer ring, the hub main body and the outer ring are assembled together while rotating the hub main body relative to the outer ring.

3. The method according to claim 1, further comprising fitting the inner ring, in which tapered rollers are disposed on the second inner ring raceway, on the hub main body so that the tapered rollers are rollably disposed between the second inner ring raceway and the second outer ring raceway.

4. An apparatus for use in assembling a double row tapered roller bearing which includes an outer ring including a first outer ring raceway and a second outer ring raceway on an inner circumferential surface thereof, a hub main body including a first inner ring raceway which confronts the first outer ring raceway and including a radially outwardly projecting flange at one end portion thereof, an inner ring that includes a second inner ring raceway which confronts the second outer ring raceway and is fitted on an outer circumferential surface of the other end portion of the hub main body, a row of tapered rollers which are provided rollably between the first inner ring raceway and the first outer ring raceway, a cage that includes a plurality of pockets for arranging the row of tapered rollers at equal intervals along a circumferential direction, and a seal ring provided on an inner circumferential surface of an end portion of the outer ring which lies on a side close to the first outer ring raceway, the apparatus comprising:

a support member on which the outer ring is placed with the first outer ring raceway side thereof oriented upwards; and a supply member disposed above the support member and adapted to supply the tapered rollers onto the outer ring, wherein the support member includes:

an outer cylindrical portion including a first annular stepped portion on which the outer ring is to be placed and which is formed on an outer circumferential surface at an upper end portion thereof; and a cylindrical support portion that is disposed so as to move axially in an interior of the outer cylindrical portion and includes a second annular stepped portion formed on an outer circumferential surface at an upper end portion thereof on which the tapered rollers are to be placed, and wherein the supply member includes:

a guide member including a guide hole through which the tapered rollers are transferred; and a rotary member disposed concentrically with the support portion below the guide member, and including an engagement portion which is brought into engagement with the upper end portion of the support portion, and a plurality of groove portions formed on an outer circumferential surface thereof, wherein the rotary member is configured to be rotated relative to the guide member so that raised portions between the adjacent groove portions push radially outwards the tapered rollers disposed on the second stepped portion.

5. The method according to claim 1, wherein, when the subassembly member in which the cage and the first outer ring raceway of the outer ring are combined with each other is provided, at least a portion of the pockets lack tapered rollers.

6. The apparatus according to claim 4, wherein the supply member is formed so as to move from an initial position to another position above the support member after the outer ring is placed with the first outer ring raceway side thereof oriented upwards and to move to a position upward of the support member after the tapered rollers are supplied onto the outer ring.

7. The apparatus according to claim 4, wherein the cylindrical support portion is moveable in an axial direction relative to the outer cylindrical portion.

8. The apparatus according to claim 4, wherein the cylindrical support portion includes a piston disposed so as to move the cylindrical support portion in an axial direction relative to the outer cylindrical portion.

9. The method according to claim 1, further comprising supporting the subassembly member on a support member,
wherein the disposing of the rotary member is performed after supporting the subassembly member on the support member.

10. The method according to claim 9, further comprising moving the rotary member upwards from the support member after the rotating of the rotary member.

* * * * *